2,892,732
AERATED SOLID WAX COMPOSITION AND PROCESS OF MAKING IT

Louis B. Rockland, Pasadena, Calif.

No Drawing. Application June 28, 1956
Serial No. 594,398

8 Claims. (Cl. 106—271)

This invention is directed to a new and unique process for forming decorative and otherwise useful porous waxy objects without working heated or melted waxes.

The necessity of using heated or melted waxes in the most common methods of forming wax objects such as candles, molds and figurines presents certain problems. For example, the melted wax is highly inflammable and is capable of causing serious personal injury. In forming multi-colored objects the waxes of different colors tend to flow into each other producing undesirable shades or blends. Further, the heated waxes tend to cool rapidly allowing only a short working time since the cooled wax is difficult to form.

Accordingly, one of the principal objects of this invention is to provide a process for treating aqueous wax emulsions to form a wax semisolid workable at ambient temperatures.

A further object of this invention is to provide a series of emulsions which may be treated so as to form a stable waxy semisolid workable at ambient temperatures.

A further object of this invention is to provide a process for treating wax emulsions whereby decorative wax objects of varying colors may be formed.

A more specific object of this invention is to provide a process for treating aqueous wax emulsions whereby an opaque, aerated wax semisolid workable at ambient temperatures may be formed.

Further objects and advantages of this invention, it is believed, will be readily apparent from the following detailed description of preferred embodiments thereof.

Briefly, this invention comprises the aerating by suitable means of an aqueous wax emulsion, said emulsion having a high solids content and a relatively low viscosity.

I have discovered that certain combinations of surface active agents, water and waxes may be emulsified, forming aqueous wax solutions of relatively low viscosity and these solutions, when aerated at ambient temperature, are changed to an opaque waxy mass of any desired viscosity up to and including a solid.

More specifically, I have discovered that if an inert gas, such as air, nitrogen, carbon dioxide or helium is introduced with agitation into an emulsion of the so-called oil-in-water type, a relatively stable three-phase oil-in-water:gas-in-water mixture is formed which tends to become increasingly more viscous and may be gradually changed from a free flowing fluid to a plastic solid. This may be accomplished at ambient temperature. Ambient temperature, as used herein, may be defined as the temperature range from 65° F. to 85° F. In specifying this temperature range, it is to be understood that the limits indicated are not critical but are merely illustrative of the fact that a workable waxy plastic mass may be obtained without heating the emulsion. The viscosity or consistency of the final product is a function of the amount and type of gas introduced, the rate of agitation, the solids content of the emulsion and the type of surface active agents and waxes used. In this manner it is possible to form waxy materials having wide ranges of viscosity and plasticity.

The advantages of such a waxy material are immediately apparent. Since no heat is required in treating the emulsion, the dangers inherent in heat waxes are eliminated. Further, the setting time, or time required for the waxy mass to solidify, is very long in comparison to the heated waxes, permitting greater care in forming the desired objects. Delicate scents or perfumes may be added to the emulsion without the danger of their being destroyed either by heat or chemical reaction. So too, a wider range of colors may be used than would be possible in processes which require heat to form the wax objects. In addition, different colored waxes would have no tendency to flow into or blend with each other.

When the emulsions are aerated to the desired plasticity, the waxy semisolid may be molded in a cold mold, formed as by hand or extruded in a standard extrusion press. The formed object may then be dried by allowing the water to evaporate. The drying may be hastened by the use of dry air, in which case the formed object is dried in thirty minutes or so, depending upon the configuration. When the object has been dried, it has the stability of the wax used in the emulsion, it has an opaque appearance imparted by the aeration and it has the exact dimensional characteristics given it in the forming of the object. At any time before the formed object has dried, the waxy mass can be re-emulsified by the addition of water.

Generally, emulsions which may be treated by the process which is the subject of this invention are formed from water, ordinary waxes and surface active agents of the non-polar type. By proper selection of the proportions and types of the emulsifiers and waxes, a relatively low viscosity, high solids content emulsion, which is stable at ambient temperatures, may be formed. If such an emulsion is aerated by the introduction of a gas, such as air, the emulsion loses its stability. A possible explanation of the thickening of the emulsion to a plastic mass through the introduction of minute gas bubbles may be as follows. The emulsifiers have a greater affinity for the gas-liquid interphase than for the wax-liquid interphase. The migration of the emulsifiers from the wax-water to the air-water interphase causes the partial precipitation and agglomeration of minute wax particles which cause the viscosity and consistency of the now quasi-emulsion to increase at a rate proportional to the rate and volume of gas incorporated into the emulsion and dependent on the type and quantity of waxes and emulsifiers present in the original emulsion. It has been found that the increase in viscosity upon aerating is directly proportional to the wax content and inversely proportional to the emulsifier content within certain ranges of concentration. It has been discovered that satisfactory results may be obtained when the wax content is between about 25% and 70% by weight and the total by weight emulsifier content is limited to from about 3% to 15% by weight.

It has been observed that an excess of surface active agents would decrease or inhibit the rate at which the emulsion may be thickened to a useful opaque plastic mass, since this excess would tend to hold the wax particles in colloidal suspension as well as to concentrate at the air-liquid interphase. However, it is necessary that there be sufficient emulsifier present to permit the preparation of a stable form of the original non-aerated emulsion. It is, therefore, apparent that for any particular emulsion, there exists an optimum ratio of emulsifiers to wax, this ratio being such that the emulsion is stable at ambient temperatures but being capable of being destabilized by aeration.

The following are specific examples of stable emulsions and method of their formation which, upon aeration, may be converted into plastic masses.

In these examples, all proportions used represent parts by weight, unless otherwise indicated:

Example No. 1

(1) 2.85 parts emulsifier A
(2) 8.57 parts emulsifier B
(3) 28.58 parts paraffin (m. pt. 135°–137° F.)
(4) 60.00 parts water (1), (2) and (3) were melted together and brought to a temperature of 110° C. Water heated to about 90° C. was slowly added to this mixture with vigorous stirring. The mixture was then gently stirred and allowed to cool to ambient temperature. The resulting emulsion is a heavy white cream.

Example No. 2

(1) 10.0 parts emulsifier C
(2) 25.0 parts paraffin (m. pt. 138°–140° F.)
(3) 50.0 parts water The process used in preparing this emulsion is identical to Example No. 1. After cooling, a smooth, slightly pasty white emulsion is obtained.

Example No. 3

(1) 10.0 parts emulsifier D
(2) 100.0 parts paraffin (m. pt. 135°–137° F.)
(3) 150.0 parts water (1) and (3) were heated to about 85° C. Molten paraffin heated to about 90° C. was slowly added to the aqueous solution with vigorous agitation. The resulting mixture was allowed to cool to ambient temperature without stirring. The final emulsion is an opaque, thin white fluid.

Example No. 4

(1) 25.0 parts emulsifier E
(2) 12.5 parts emulsifier F
(3) 12.5 parts emulsifier G
(4) 50.0 parts emulsifier D
(5) 1000.0 parts paraffin (m. pt. 135°–137° F.)
(6) 1000.0 parts water (1), (2), (3), (4) and (6) were heated to 85° C. and were allowed to cool to 75° C. The paraffin, previously heated to 90° C., was slowly added to the aqueous solution with vigorous agitation. The resulting solution was allowed to cool to room temperature without stirring. The cooled emulsion is an opaque white creamy fluid.

Example No. 5

(1) 5.0 parts emulsifier E
(2) 5.0 parts emulsifier F
(3) 100.0 parts paraffin (m. pt. 135°–137° F.)
(4) 70.0 parts water (1), (2) and (3) were melted together and brought to a temperature of 110° C. Water heated to about 90° C. was slowly added with vigorous stirring. The resulting mixture was allowed to cool to ambient temperature with gentle stirring. The cooled emulsion is a heavy white cream.

The following information provides a key to the identity of the surface active agents or emulsifiers in the foregoing examples:

Emulsifier A, trade name Ethomid HT/15, a product of the Armour Chemical Division, Armour & Company, is an N,N-disubstituted fatty acid amide in which the amide hydrogen atoms are substituted by polyoxyethylene groups and the fatty acid moiety contains from 10 to 18 carbon atoms which may be represented by the following structure:

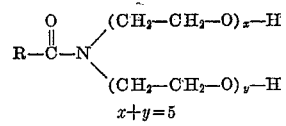

Emulsifier B, trade name Ethofat 60/20, a product of Armour Chemical Division, Armour & Company, is a mixture of palmitic and stearic acid esters of polyoxyethylene glycols and is represented by the following structure:

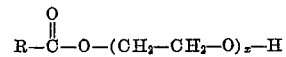

R = stearic or palmitic acid residue
x = 10

Emulsifier C, trade name Tween 65, a product of the Atlas Powder Company, is a polyoxyethylene sorbitan tristearate. Typical structures are represented by:

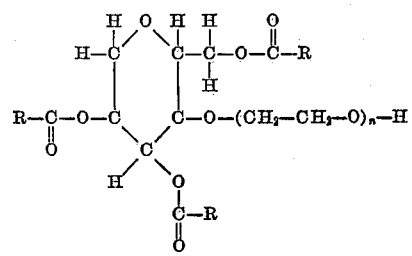

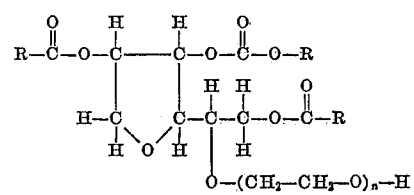

Emulsifier D, trade name Myrj 45, a product of Atlas Powder Company, is a polyoxyethylene stearate and may be represented by the following structure:

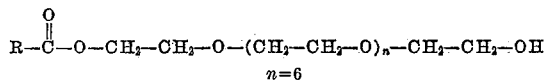

Emulsifier E, trade name Span 40, a product of Atlas Powder Company, is a partial ester of palmitic acid. Typical structures are:

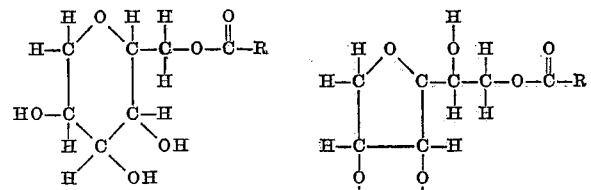

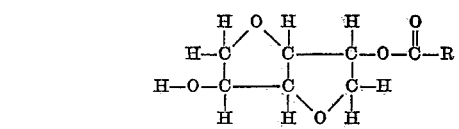

R is a palmitate residue

Emulsifier F, trade name Tween 40, a product of Atlas Powder Company, is a polyoxyethylene sorbitan monopalmitate; typical structures are:

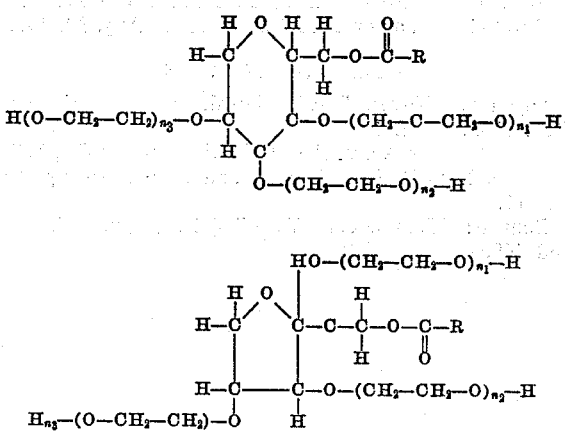

Emulsifier G, trade name Tween 60, a product of Atlas Powder Company, is a compound similar to Tween 40 except that the principal fatty acid moiety is stearic rather than palmitic acid.

The following table is a summary of the above examples, indicating the percentage by weight of the various constituents:

| Constituent | Example number Percent by weight | | | | |
| --- | --- | --- | --- | --- | --- |
| | 1 | 2 | 3 | 4 | 5 |
| Emulsifier A | 2.85 | | | | |
| Emulsifier B | 8.57 | | | | |
| Emulsifier C | | 11.80 | | | |
| Emulsifier D | | | 3.84 | 2.38 | |
| Emulsifier E | | | | 1.18 | 2.75 |
| Emulsifier F | | | | 0.59 | 2.75 |
| Emulsifier G | | | | 0.59 | |
| Paraffin | 28.58 | 29.40 | 38.40 | 47.63 | 55.60 |
| Water | 60.00 | 58.80 | 57.76 | 47.63 | 38.90 |
| Total Solids, Percent | 40.00 | 41.20 | 42.24 | 52.37 | 61.10 |

Each of the emulsions indicated may be converted to a plastic semisolid by aeration. For example, if the emulsion indicated in Example 5 is beaten with a rotary beater, the emulsion will tend to froth. As beating is continued, the viscosity and volume will increase. If beating is continued long enough, the emulsion is converted into a very stiff plastic mass which is almost solid and barely workable. If beating is continued only until the volume of the original emulsion is double, a soft, easily workable plastic mass is obtained. This mass may be extruded, molded, or otherwise formed into any desired shape. Upon drying the resulting object will be rigid, dimensionally stable and insoluble in water at ambient temperatures. The presence of the minute air bubbles causes the wax to be opaque and to impart to the resulting formed object an increased strength and stability not found in wax objects formed by the common heating method. For example, a candle formed of the aerated emulsion is stronger and less inclined to wilt in the presence of heat than non-aerated waxes.

As has been indicated previously, various dyes and scents may be added to the cooled aqueous emulsions to give specific desired effects. Perfumes or other scents added to the emulsion would not tend to evaporate or change during the working of the wax because of the absence of heat. The aerated plastic mass has no tendency to flow thereby permitting varying colored waxes to be placed side by side without any tendency to intermingle or blend. The presence of the minute air bubbles causes the formed objects to be opaque. This characteristic is maintained, even upon heating, until the wax is melted. In candles, for example, wax surrounding the wick maintains its opaque characteristic during burning until it is actually melted. Because the aerated emulsion may be formed at ambient temperatures, molded objects are dimensionally stable, having no tendency to shrink or expand on setting.

While I have shown five emulsions which may be treated by the process which is the subject of this invention, it will be obvious to those skilled in the art that there is a wide range of aqueous emulsions which may be used advantageously. While in the examples given, only paraffin waxes have been specified, other solid waxy materials may be similarly processed. These include low molecular weight polyethylenes and other synthetic waxes, fatty alcohols and their esters, fatty acids and their esters, long-chain aldehydes and ketones, beeswax, lanolin, carnauba wax, ouricuri wax, candelilla wax, Madagascar wax, Douglas fir wax, japan wax, apple cuticle wax, corn seed and sunflower seed waxes and jojoba wax.

In addition to the surface active agents specified in the examples, it has been determined, as has been indicated, that any non-polar surface active agent would be satisfactory. While the wax content of the emulsion may vary between about 25% and 70% by weight and the surface active agent content is limited to from about 3% to 15% by weight, for any given emulsion, the ratio must be such that the emulsion is stable at ambient temperatures to be capable of being destabilized on aerating. The composition of emulsions may, therefore, be determined by the characteristics desired in the finished wax object.

Having fully described my invention, it is to be understood that I do not wish to be limited to the precise details of the examples set forth but my invention is of the full scope of the appended claims.

I claim:

1. A process for preparing an aerated dimensionally stable wax semi-solid, the steps comprising: preparing a mixture comprising wax from 25% to 70% by weight, a non-polar surface active agent from 3% to 15% and water, said mixture being heated above the melting temperature of said wax and below the boiling point of the water; emulsifying the heated mixture; cooling the emulsified mixture to ambient temperature; and aerating said cooled mixture.

2. A process as set forth in claim 1 wherein: said wax is paraffin wax.

3. A process as set forth in claim 1 wherein: said wax is a paraffin wax; and said surface active agent is at least one agent selected from the group consisting of palmitic and stearic acid esters of polyoxyethylene glycols, polyoxyethylene sorbitan tristearate, polyoxyethylene stearate, partial esters of palmitic and polyoxyethylene sorbitan monopalmitate.

4. A process for preparing an aerated dimensionally stable wax solid, the steps comprising: preparing a mixture comprising wax from 25% to 70% by weight, a non-polar surface active agent from 3% to 15% and water, said mixture being heated above the melting temperature of said wax and below the boiling point of the water; emulsifying the heated mixture; cooling the emulsified mixture to ambient temperature; aerating said cooled mixture until said mixture becomes a dimensionally stable semi-solid; forming said semi-solid into a predetermined shape; and evaporating the water from said semi-solid to form a dimensionally stable solid.

5. A wax semi-solid, comprising: substantially solid phase comprising a mixture of about 25% to 70% by weight wax, 3% to 15% by weight of at least one non-polar surface active agent, and water; and a gaseous phase substantially uniformly distributed throughout said solid phase and constituting at least 50% of the volume of said semi-solid.

6. A wax semi-solid as set forth in claim 5, wherein said wax is paraffin wax.

7. A wax solid, comprising: substantially solid phase comprising a mixture of about 25% to 70% by weight wax, 3% to 15% by weight of at least one non-polar surface active agent; and a gaseous phase substantially uniformly distributed throughout said solid phase and constituting at least 50% of the volume of said semi-solid.

8. A wax solid as set forth in claim 7, wherein said wax is paraffin wax.

References Cited in the file of this patent

UNITED STATES PATENTS

| | | |
|---|---|---|
| 2,598,666 | Sesso et al. | June 3, 1952 |
| 2,684,948 | Cross | July 27, 1954 |
| 2,716,611 | Paxton | Aug. 30, 1955 |

OTHER REFERENCES

"Span and Tweens," Atlas Powder Co., Wilmington, Del., 1943, pp. 2, 12 to 17.

"Atlas Surface Active Agents," Atlas Powder Co., Wilmington, Del. (1950), Tables I and II, between pp. 10 and 11.

Bennett: "Commercial Waxes" (1944), pp. 464, 465 and 469.